United States Patent [19]

Sakurai

[11] Patent Number: 4,685,743
[45] Date of Patent: Aug. 11, 1987

[54] WHEEL ANTI-SKID ATTACHMENT

[76] Inventor: Hitoshi Sakurai, Suite 503, Fuji-shoji Bldg., 2-3, Sakuragaoka-cho, Shibuya-ku, Tokyo, Japan

[21] Appl. No.: 806,794

[22] Filed: Dec. 9, 1985

[51] Int. Cl.⁴ .............................................. B60B 15/26
[52] U.S. Cl. ................................... 301/44 T; 301/47; 152/210
[58] Field of Search ...................... 301/44 R, 44 T, 45, 301/47, 50; 152/210

[56] References Cited

U.S. PATENT DOCUMENTS

| | | | |
|---|---|---|---|
| 1,186,232 | 6/1916 | Ross | 301/44 T |
| 1,336,149 | 4/1920 | Nelson et al. | 301/44 T |
| 1,908,692 | 5/1933 | Connell | 301/44 T |
| 2,540,382 | 2/1951 | Sigler et al. | 301/47 |
| 3,482,880 | 12/1969 | Ceccucci | 301/47 |
| 3,934,632 | 1/1976 | Kalpin et al. | 152/210 |

FOREIGN PATENT DOCUMENTS 2291874  6/1976  France .................... 301/47

Primary Examiner—David A. Scherbel
Attorney, Agent, or Firm—Wenderoth, Lind & Ponack

[57] ABSTRACT

A vehicle slip protector including a frame to be fixed to a vehicle wheel for rotation therewith, spokes extending radially outward from the center axis of the frame which is aligned with the axle of the wheel, so as to be radially reciprocally slidably mounted to the frame, elastic shoes attached to the outer ends of the spokes, coils on the spokes urging the shoes radially outward to contact a road surface, and spikes embedded in the shoes for projecting outwardly of the shoes into contact with the road surface in response to a predetermined radial compression of the shoes applied by the coil springs while the elastic shoes are in contact with the road surface.

7 Claims, 5 Drawing Figures

WHEEL ANTI-SKID ATTACHMENT

BACKGROUND OF THE INVENTION

The present invention relates to a car accessory, and more particularly, to a slip protector for protecting a car from slippage on a road covered with ice.

In order to protect the wheels from slipping on a road covered with ice or snow, the tires may be provided with chains. However, chains should be removed when the road is no longer slippery and repeated application and removal of chains from tires is very troublesome. Inorder to avoid this difficulty, some tires have been provided with spikes. However, such tires scrape the pavement surface, which shortens the life of the pavement and causes air pollution resulting from dust. This results from the fact that the spikes protrude from the tire when the tire is pressed against the pavement by the weight of the car and load, whereby the tips of the spikes penetrate the surface of the pavement to a slight extent when the pavement is not covered with ice or snow.

SUMMARY OF THE INVENTION

It is an object of the present invention to provide a car slip protector which does not scrape a bare road surface.

It is another object of the present invention to provide a car slip protector which does not cause air pollution with dust.

A further object of the present invention is to provide a car slip protector which does not shorten the life of the road.

It is still another object of the present invention to provide a car slip protector whose pressure is applied independently of the pressure on the tire.

The car slip protector of the present invention is so constructed that it is not attached on or in a tire, but is attached to the side of a tire independently of the tire. The pressure applied between the car slip protector and the pavement surface can be determined independently of the pressure on the tire caused by the weight of the car and its load, and is determined by the pressure (stiffness) of a spring coil whose pressure may be determined so that the car slip protector does not stick into the pavement when the pavement is not covered by ice or snow, but which adequately protects the tire against slippage when the pavement is covered by ice or snow.

BRIEF DESCRIPTION OF THE DRAWINGS

A better understanding of the invention, its operating advantages and specific objects obtained by its use may be obtained from the following detailed description of the preferred embodiment when taken with the accompanying drawings in which.

DETAILED DESCRIPTION OF THE PREFERRED EMBODIMENT

Figure 1:
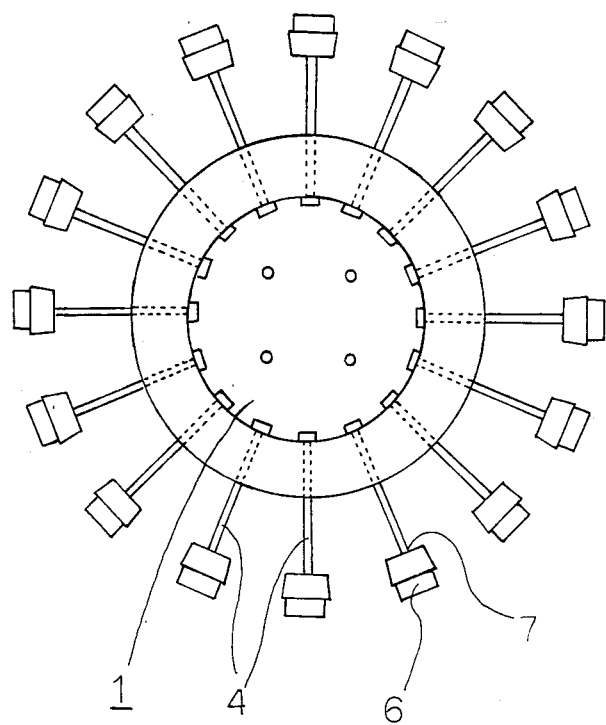
FIG. 1 is a side view of car slip protector in accordance with one preferred embodiment of the present invention.
Figure 2:
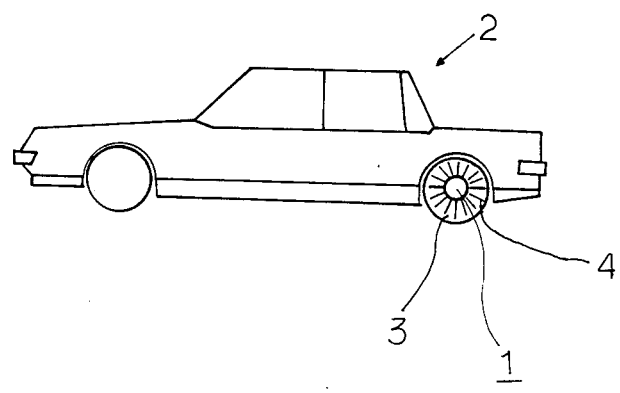
FIG. 2 is a side view of the car slip protector attached to a side of a tire of a car.
Figure 3:
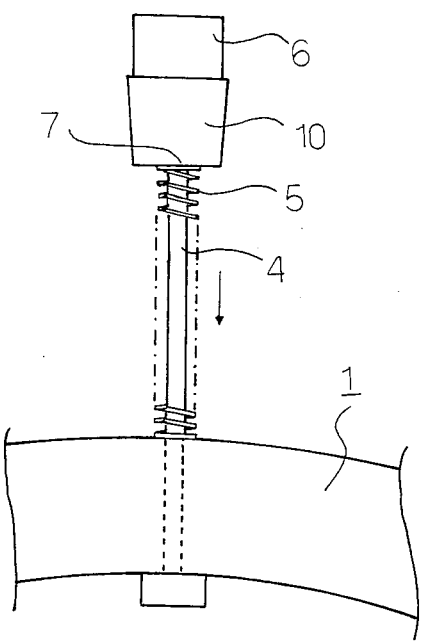
FIG. 3 is an enlarged side view of a spoke of the car protector illustrated in FIG. 1.

The car slip protector of the present invention is described with reference to teh drawings as follows:

FIG. 1 shows a car slip protector having an attachment means (frame) 1 for attaching the car slip protector to a wheel 3 or the axle thereof of a car 2 as illustrated in FIG. 2. The car slip protector includes radially outwardly extending spokes for slidably supported in the attaching means 1 as illustrated in FIGS. 1, 2 and 3. Each spoke 4 extends radially outward from the center axis of the frame 1 which is aligned with the axle of the wheel 3 as is apparent in FIG. 2, and has a spring coil 5 (omitted in FIG. 1) pushing the spoke 4 outward as illustrated in FIG. 3.

Figure 4:
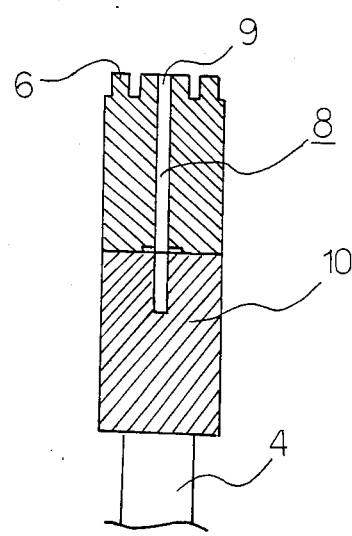
FIG. 4 is an enlarged side view of an elastic shoe.

Mud covers may be placed on the spring coils 5. An elastic, e.g. rubber, shoe 6 is attached to the radially outer end 7 of each spoke 4 as illustrated in FIG. 3. A snow-pin or spike 8 is embedded in each elastic shoe 4 as shown in FIG. 4, FIG. 4 being a cross-sectional view of the elastic shoe. The tip 9 of the spike 8 projects out of the elastic shoe 6 when the elastic shoe 6 is pressed against a road surface covered with ice or snow, so as to stick into the ice or snow. Since the pavement is substantially harder than the ice or snow, the outward pressure applied by the spring coil 5 can be initially established so that its tension is such that the spike 8 will penetrate ice or snow but will not penetrate an exposed road pavement not covered with ice or snow.

The spoke 4 can be supported at a plurality of positions, and can also be formed of stainless steel. The spoke 4 may have a rolling protector so that the elastic shoe 6 can be set to a stable direction.

Figure 5:
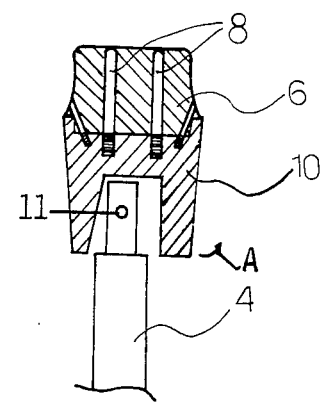
FIG. 5 is an enlarged side view of an elastic shoe of another embodiment of the present invention.

The elastic shoe 6 may be attached to the spoke 4 through a supporter 10 as illustrated in FIGS. 3, 4 and 5, so that the elastic shoe 6 is held with the spike 4, but can be replaced by a new shoe when it is worn out. In accordance with the alternate embodiment of the invention as illustrated in FIG. 5, the elastic shoe 6 may be pivotally mounted to the spoke 4 by a pin 11 for partial pivotal movement in the direction of the arrow A so that during rotation of the wheel, the elastic shoes 6 and spikes 8 will maintain longer contact with the road surface as the wheel rotates, thereby further reducing the likelihood of slip.

The elastic shoe 6 may also be made of hard rubber or fiber reinforced plastic. Also, a plurality of spikes such as is illustrated in FIG. 5, can be employed in an elastic shoe 6 so as to further reduce the likelihood of slip.

The various features of the present invention are pointed out with particularity in the claims forming a part of this specification. It should be understood that changes may be made from the preferred embodiments without departing from the spirit of the invention or sacrificing any of the advantages thereof.

I claim:

1. A vehicle slip protector device, comprising:
a frame having a center axis, for being fixed to a vehicle wheel for rotation therewith, with said center axis axially aligned with the axle of the vehicle wheel;
a plurality of spokes extending radially outward from said center axis radially reciprocally slidable mounted to said frame, each of said spokes having a radially outer end spaced from said frame;
elastic shoes respectively attached to said spokes at said outer end;

spring coils on said spokes urging said elastic shoes radially outward into contact with a surface on which the wheel is rolling; and spikes embedded in said elastic shoes, said spikes having radially outer ends which project radially out of said elastic shoes in response to a predetermined radial compression of said elastic shoes.

2. A device as in claim 1, wherein said spokes are made of stainless steel.

3. A device as in claim 1, wherein said elastic shoes are made of fiber reinforced plastic.

4. A device as in claim 1, wherein said elastic shoes are made of hard rubber.

5. A device as in claim 1, wherein a plurality of said spikes are embedded in each of said elastic shoes.

6. A device as in claim 1, wherein said elastic shoes are pivotally mounted to said spokes so as to pivot while in contact with a surface along which the wheel is rolling.

7. A device as in claim 6, further comprising supporter members respectively pivotably mounted on said spokes, said elastic shoes being respectively removably fixed on said supporter members, said spikes having ends opposite said radially outer ends extending into said supporter members.

* * * * *